May 19, 1936. L. H. P. BASTIN 2,041,107
BUSH
Filed April 14, 1934 2 Sheets-Sheet 1

LOUIS H. P. BASTIN, Inventor

By [signature] Attorney

May 19, 1936.  L. H. P. BASTIN  2,041,107
BUSH
Filed April 14, 1934   2 Sheets-Sheet 2
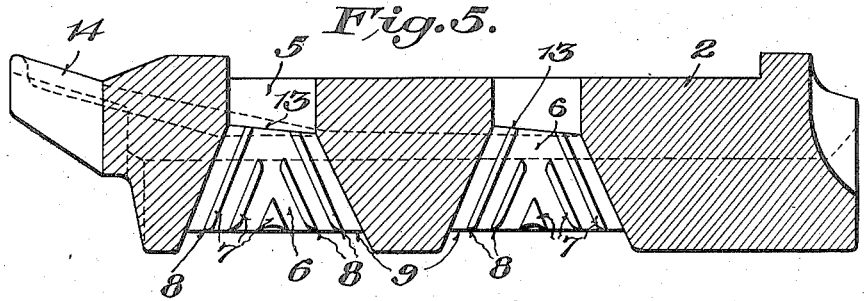
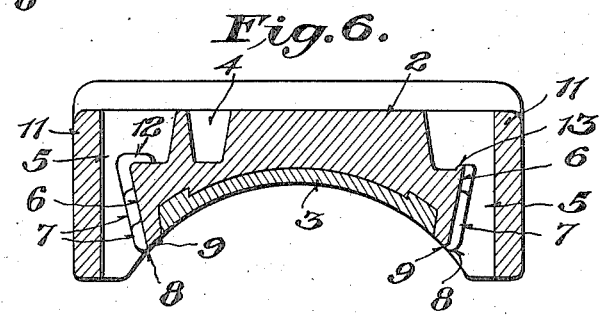
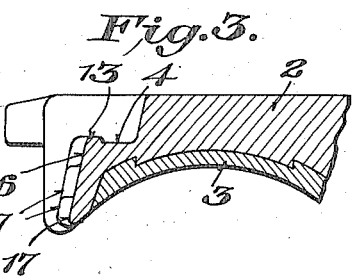 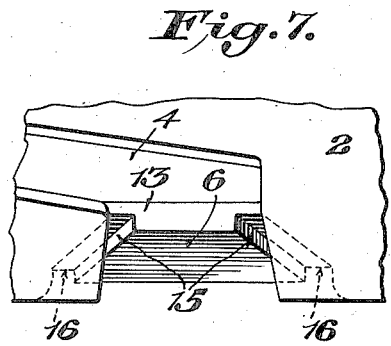
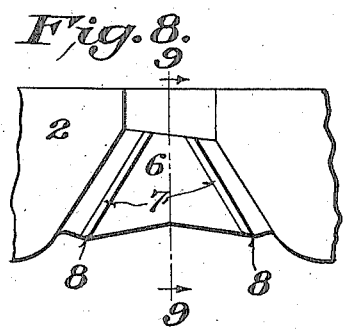 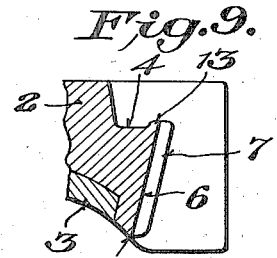
Inventor
LOUIS H. P. BASTIN
By
Attorney Patented May 19, 1936

2,041,107

UNITED STATES PATENT OFFICE 2,041,107

BUSH

Louis Henri Pierre Bastin, Bois-Colombes, France, assignor to Societe Generale Isothermos S. A., Paris, France, a corporation of France Application April 14, 1934, Serial No. 720,622
In France April 19, 1933

9 Claims. (Cl. 308—79.1)

This invention relates to bearings for mechanically lubricated journal boxes, such as for instance a railroad car journal box in which the oil is supplied from the top of the bearing.

Heretofore, in journal boxes of this type, bearings have been used which have oil distributing grooves on their outer surfaces, the said grooves ending in transverse passages leading to the inner surface of the bearing, or into grooves on this surface; or, the outer channels may lead to surfaces on the outside of the bearing so as to permit the oil to flow by gravity to a distributing edge and thus feed it over the journal. However, bearings of the types referred to, usually have the outer passages arranged in symmetrical pairs on each side of the bearing, so that the oil has a tendency to form only two ribbons which leave the zones between the ribbons dry or with insufficient oil for an undesirable period of time. This is due to the fact that certain oils spread only with difficulty so that a relatively long time elapses between the moment of starting and the time that the engaging surfaces of the bearing and the journal become adequately lubricated from one end to the other. This condition may occur in spite of an entirely adequate or sufficient oil supply. Delay in spreading or distributing the oil over the whole surface of the bearing may have very serious consequences in the case of heavily loaded and high speed bearings, such, for example, as those used in railroad journal boxes.

Various attempts have been made to secure a division or distribution of the oil stream brought to the bearing over practically the whole length of the bearing surface, either by providing a series of openings on each side or by having passages arranged in fan-shape, all fed from a main transverse passage. Nevertheless, such prior arrangements have not given satisfaction in practical service because they have not been able to produce the desired results. In the case of multiple passages arranged in series, those which are located near the place where the oil enters naturally are the only ones which receive any oil at all at low speeds when the supply is feeble, and, moreover it is practically impossible to obtain a uniform distribution on account of the inherent defects of design and arrangement.

Accordingly, the present invention relates to a bearing of simple and economical construction which aims to overcome the disadvantages previously mentioned. Like other known bearings, it carries upon the upper surface supply channels for the oil, but it is distinguishable from them by the fact that each of these channels ends in or leads to a distributing surface which, either by the arrangement of its surface, or by the outline of its lower edge, or by a combination of these two factors, produces a widening of the oil stream flowing over said surface and discharged from the edge formed by its lower boundary onto the rotating journal, thereby covering a wide surface so that the whole length of the bearing will be quickly lubricated. Furthermore, the oil distributing surfaces at opposite sides of the bearing are arranged out of line, that is, in staggered relation, thereby to adequately lubricate the entire surface of the journal simultaneously and uniformly.

The accompanying drawings show several embodiments of the invention applied to bearings for railroad journal boxes.

Figure 3 is a partial section of the same bearing along the line 3—3 of Figure 1.

Figure 5 is a section along the line 5—5 of Figure 4.

Figure 6 is a section along the line 6—6 of Figure 4.

Figures 7 and 8 show variations of detail.

Figure 9 is a section along the line 9—9 of Figure 8.

Similar reference characters designate corresponding parts throughout the several figures of the drawings.

Figure 1:
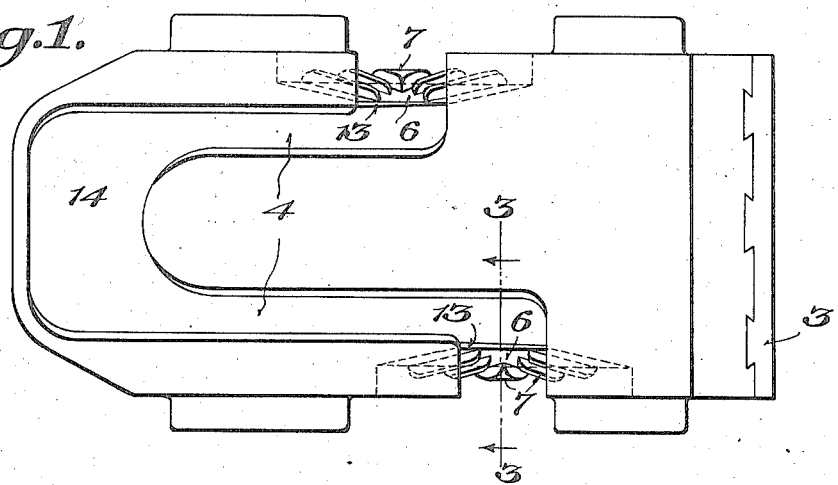
Figure 1 is a plan view of one embodiment.
Figure 2:
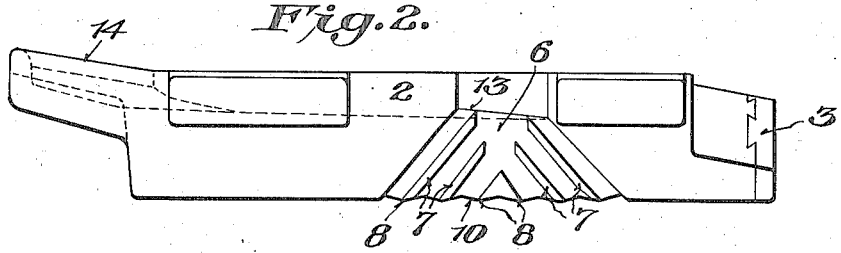
Figure 2 is a side elevation of Figure 1.

Referring to Figures 1 to 3, it will be seen that bearing 2 has on its outer or upper surface two channels 4 connecting the oil collecting space or well 14 in the front of the bearing with a distributing surface 6. This surface 6 has the general form of a trapezoid or trapezium of which the small base corresponds to the opening of channel 4 and the large base to the zone from which the oil coming from the channel must be distributed over the journal. In order to facilitate the widening or spreading of the oil stream coming from channel 4, the latter, at its junction with surface 6, is traversed by a sill 13 which is slightly inclined in the direction of movement of the oil in the channel, so as to obtain practically a uniform flow over the whole width of the opening.

The distribution of the oil flow over the whole width of the lower boundary of surface 6 is obtained by means of ribs 7 arranged so as to form between them channels practically parallel to the sides of the trapezium, to the right and to the left of its axis of symmetry. The lower extremity of each rib 7 constitutes a point from which the oil will easily detach itself even when it arrives only in small quantities. In order to further facilitate the spreading of the oil flowing between two ribs 7, the lower boundary of surface 6 may present between each pair of ribs the outline shown in Figure 2, i. e. slanted edges 10, so that the whole gives the appearance of a zigzag line, that is, a serrated bottom feeding edge.

The lower transverse boundary of surface 6 may either be rounded off as at 9 or may be a sharp edge.

As shown on the drawings, the two distributing surfaces 6 are staggered with respect to each other so as to obtain, as quickly as possible, the wide distribution of the oil over the length of the bearing.

Figure 4:
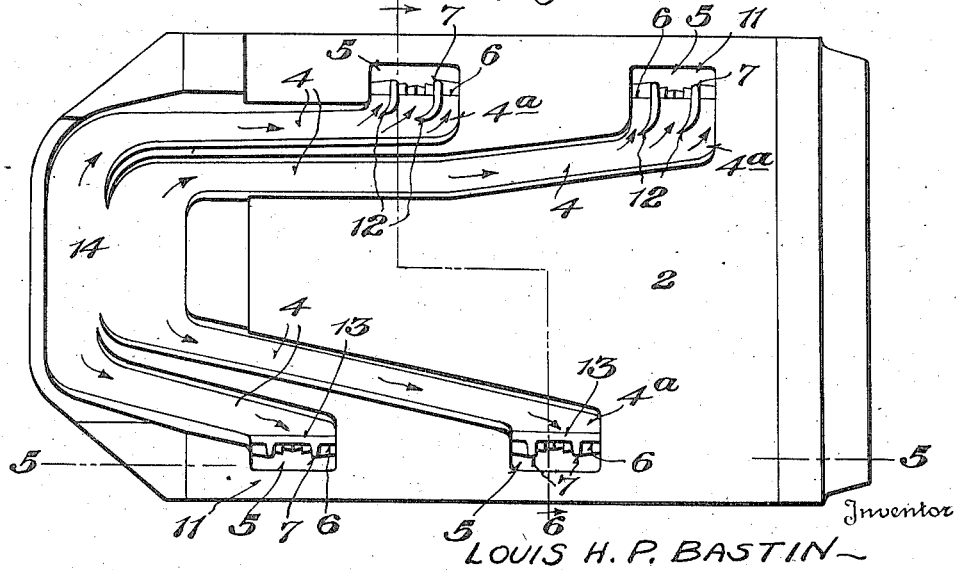
Figure 4 is a plan view of another embodiment.

Figures 4 and 6 show a second embodiment of the invention. In this case the bearing has on its outer surface four channels 4, each leading to a distributing surface 6, and lateral openings 5 of the bearing, at the bottom of each of which is one of these surfaces, masked by a bridge wall 11 so as to reinforce it whenever conditions require.

In the lower half of Figure 4, the channels 4 and the surfaces 6 are similar to those shown in Figures 1 to 3, while in the upper half of Figure 4 the sill 13 is omitted but, as indicated at 4ª, two ribs 7 are extended in the shape of spurs 12 down to the bottom of the channel so as to bring about a primary division of the oil stream before it arrives on the surface 6. In this embodiment, the lower boundary of these surfaces 6 is rectilinear.

In Figure 7 an arrangement of surface 6 is shown in which the division of the oil coming from channel 4 is secured by means of two grooves 15 carved out of the surface on each slanted side of the trapezium so that the oil at first arrives at the lower boundary of surface 6 by way of the lower outlets 16 of these grooves.

Figures 8 and 9 show respectively in elevation and section another variety of the surface of distribution 6. In this case this surface has only two ribs 7, but its lower boundary is inclined beginning at the center as well as at its extremities towards the lower extremities of the ribs, so as to facilitate the distribution of the oil flowing between the two ribs 7 and between the sides of the distributing surface and these ribs.

In all embodiments the surface 6 may be inclined outwardly as shown in Figure 2, or vertical or even inclined inwards, as shown in Figure 6. The surface itself may be plain or show a certain curvature facilitating the distribution of the oil.

It is, of course, understood that the profiles of rib 7 and of groove 15 may be different from that shown in the drawing. They may, for instance, in transverse section, have a triangular form or rectangular or circular. Their height or depth may also vary.

In certain cases the ribs 7 may be so shaped that at the lower boundary of the surface of distribution they form points 8 (Figure 2) from which the oil may detach itself more readily than from an edge.

It will be easily seen that the bearing heretofore described may be placed either upon a shaft or journal having the same diameter exactly as the bore of its inner surface or upon a shaft or journal of a diameter less than this bore. In the former case, the oil passes directly from the lower boundary of each distributing surface to the shaft or journal while in the latter case it collects on the edge or lower boundary of each surface and drops from there upon the shaft or journal.

From the foregoing it will be apparent that the present invention contemplates a side distributing surface 6 having means thereon, namely, the ribs 7, or their equivalent, for deploying the oil as it descends toward the axle. In effect the side distributing means is a recess which is preferably narrower at the top than at the bottom to provide a bottom feeding edge of maximum length to effect uniform oil distribution to the axle. Where the surface 6 joins the oil supply means at the top or upper side of the bearing, suitable means is provided to insure uniform reception so as to compel proper distribution. In this way no one lower portion of the surface receives more or less oil than the other so that at all times the distribution is adequately provided for. Regardless of the angular disposition of the surface 6, the oil will follow the same by surface adhesion so that the oil is further controlled to its point of use, namely, the axle at the inner face of the bearing.

It will, of course, be understood that the oil is supplied to the top of the bearing by any suitable form of oil elevating means well known in the art, as for example a dipper carried by the axle. Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A bearing for journal boxes having top oil supply channels, and distributing surfaces at the sides of the bearing each having the general shape of a trapezium, with downwardly diverging sides, the lower edge of each of said surfaces being formed to provide alternate receding and projecting portions, and ribs on said distributing surfaces leading to each projecting portion of said bottom edge.

2. In a journal bearing, a bearing body having a lubricant channel in its upper face, and a single lubricant distributing surface for said supply channel, said surface being located adjacent the edge of the body and inclined downwardly at an angle to the channel, said surface also having the general shape of a trapezium with its narrow edge located at the junction of the supply channel and the surface and having its wide base located at the inner face of the bearing and in feeding relation to a journal in the bearing, said narrow base of the trapezium including a sill inclined in the direction of movement of the oil in the channel so as to obtain a practically uniform flow from the channel to the distributing surface.

3. A journal bearing having an oil supply channel in its top and also having a side recess of downwardly flaring shape communicating at its top with said oil supply channel, said oil supply channel being disposed entirely inwardly of said recess so that oil flowing from said channel into said recess is delivered onto and confined to the surface defining the inner side of said recess, and means for causing oil delivered to the top of said surface and flowing downwardly thereover to spread longitudinally along said surface, the bottom edge of said surface being disposed to deliver oil onto an axle journaled in the bearing.

4. A journal bearing having in its top a longitudinally extending oil supply channel the bottom of which is inclined to the horizontal for the flow of lubricant longitudinally therealong, the bearing having a side oil distributing surface, and a sill over which oil flows from said channel onto said surface, said sill extending substantially parallel to said channel and having its top edge sloping downwardly in the direction of flow of oil along said channel so that oil delivered from said channel to the top portion of said surface is distributed substantially uniformly along the length of the said top portion of said surface.

5. A journal bearing having in its top a longitudinally extending oil supply channel and at its side a substantially vertically disposed oil distributing surface in oil receiving relation at its top to said supply channel, and a sill over which oil flows from said channel to said surface, the top of said sill being inclined downwardly in the direction of flow of oil along said channel for the purpose set forth.

6. A journal bearing as set forth in claim 3 including means to assure that oil flowing from the oil supply channel to the top of the surface defining the inner side of the side recess is delivered to the top of said surface substantially uniformly therealong.

7. A journal bearing as set forth in claim 3 in which the means for causing longitudinal spreading of the oil which flows downwardly over the surface defining the inner side of the side recess comprises downwardly divergent ribs on said surface.

8. A journal bearing as set forth in claim 3 in which the means for causing longitudinal spreading of the oil which flows downwardly over the surface defining the inner side of the side recess comprises downwardly diverging grooves formed in said surface.

9. A journal bearing as set forth in claim 3 in which the means for causing longitudinal spreading of the oil which flows downwardly over the surface defining the inner side of the side recess comprises downwardly divergent ribs on said surface, and in which the top portions of said ribs extend laterally inward partially across the bottom of the oil supply channel to direct oil outwardly from said channel onto said surface.

LOUIS HENRI PIERRE BASTIN.